(12) United States Patent
Henry et al.

(10) Patent No.: US 11,019,565 B2
(45) Date of Patent: May 25, 2021

(54) AUTOMATED POWER-AWARE GREEN RADIO RESOURCE MANAGEMENT (RRM)

(71) Applicant: Cisco Technology, Inc., San Jose, CA (US)

(72) Inventors: Jerome Henry, Pittsboro, NC (US); Shankar Ramanathan, Richardson, TX (US); Vinay Saini, Bangalore (IN); Robert Edgar Barton, Richmond (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/548,727

(22) Filed: Aug. 22, 2019

(65) Prior Publication Data
US 2021/0058859 A1 Feb. 25, 2021

(51) Int. Cl.
*H04W 52/02* (2009.01)
*H04W 72/04* (2009.01)

(52) U.S. Cl.
CPC ....... *H04W 52/0206* (2013.01); *H04W 72/04* (2013.01)

(58) Field of Classification Search
CPC ......... H04B 7/18573; H04J 2203/0057; H04L 2012/5625
See application file for complete search history.

(56) References Cited

U.S. PATENT DOCUMENTS

| | | | | |
|---|---|---|---|---|
| 10,070,362 B2 * | 9/2018 | Kwan | ............... | H04W 24/10 |
| 10,707,578 B1 * | 7/2020 | Tran | ............... | G06N 3/08 |
| 2012/0108245 A1 * | 5/2012 | Zhang | ............... | H04W 52/0206 455/443 |
| 2012/0238279 A1 * | 9/2012 | Yu | ............... | H04W 52/244 455/449 |
| 2012/0315948 A1 * | 12/2012 | Frenger | ............... | H04W 52/0206 455/522 |
| 2014/0192712 A1 * | 7/2014 | Li | ............... | H04W 52/0206 370/328 |
| 2015/0110212 A1 * | 4/2015 | Pabla | ............... | H01Q 1/38 375/267 |
| 2018/0141541 A1 * | 5/2018 | Knaup | ............... | B60W 30/182 |
| 2018/0150005 A1 * | 5/2018 | Fujii | ............... | G03G 15/2053 |
| 2019/0274105 A1 * | 9/2019 | Papa | ............... | H04W 52/28 |
| 2020/0229110 A1 * | 7/2020 | Papa | ............... | H04W 52/54 |

* cited by examiner

*Primary Examiner* — Jamaal Henson
(74) *Attorney, Agent, or Firm* — Polsinelli PC (57) ABSTRACT

The disclosed technology relates to a process for managing power consumption of Wi-Fi access points. The solution is composed of three parts. A first part creates power profiles for each of the switches having access points within a computer network that detail how power consumption for an access point can be modified based on changing one or more elements associated with the access point. The second part creates a time-based radio constraint profile that details power requirements for an access point based on client devices connected to the access point within a pre-defined area to ensure that each client device can connect and stay connected with the access point. The third part utilizes machine learning to generate a model that identifies optimal settings for the access point in order to achieve a specific level of power consumption for the access point.

18 Claims, 7 Drawing Sheets

AUTOMATED POWER-AWARE GREEN RADIO RESOURCE MANAGEMENT (RRM)

TECHNICAL FIELD

The subject matter of this disclosure relates in general to computer networks, and more specifically automating power-aware radio resource management (RRM).

BACKGROUND

Radio Resource Management (RRM) is a wireless local area network (WLAN) controller function that automatically sets the power and channels of Wi-Fi access points. When setting the power and channels of the Wi-Fi access points, the RRM takes into account various different factors such as signals between different access points, the number of clients within an area, and client signal levels within the area. The factors are considered in order to establish the best possible coordinated power and channel values for all the access points that are within range of one another within the area.

Access points are powered using PoE (Power over Ethernet). The power consumed by each access point depends on a number of radios and spatial streams enabled as well as the power at which each of the radios operates at. RRM, however, performs its setting of power and channels for the access points without any consideration for the power consumed for each possible configuration. This raises some issues because the current RRM methodology is incapable of optimizing power consumption at each access point. There are worldwide power usage effectiveness (PUE) efforts that provide limits to the amount of power that different devices associated with an entity can consume. Current RRM processes aim to maximize the power that each access point consumes which ignores a maximum power consumption that may be established for an enterprise that utilizes multiple different access points.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

BRIEF DESCRIPTION OF EXAMPLE EMBODIMENTS

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Disclosed herein are computer-implemented methods, computer-readable media, and systems for managing power consumption for access points. The management of power consumption of access points is performed by first monitoring power consumption of access points for a pre-determined period of time. A power profile is then generated based on the monitored power consumption of the access points for the pre-determined period of time. The power profile identifies power consumption of each of the access points in relation to enabling or disabling one or more elements associated with each of the access points during the operation of the access points during the pre-determined period of time. A current state of the access points is then detected along with the client devices currently connected to the access points at a current point in time. Based on the current state of the access points and the client devices connected to the access points, a radio constraint profile is generated. The radio constraint profile identifies a minimum amount of power needed to facilitate connection of the client devices to the access points. Based on the generated power profile and radio constraint profile of the access points, the settings for the access points can be identified that allow for the satisfaction of power consumption constraints on the access points. The settings are then transmitted as instructions to the access points so that the settings can be implemented.

In some embodiments, the elements associated with the access points that can be enabled or disabled include enabling or disabling any number of radios, spatial streams, and/or ports associated with the access point. Furthermore, the enabling or disabling of the radios may include modifying a power level associated with the use of the radios. In some cases, the access points are Wi-Fi access points.

In some embodiments, the detecting of the current state of the access points and the client devices connected to the access points includes steps of identifying how many client devices are connected within a coverage area associated with the access points, and locating where the client devices are located within the coverage area with respect to a location of the access points.

In some embodiments, the settings for modifying elements of the access points are obtained using machine learning logic.

In some embodiments, the computer-implemented methods, computer-readable media, and systems for managing power consumption for access points can further detect changes to the current state of the access points and the client devices connected to the access points at a different point in time, wherein the changes includes a difference in a number of client devices connected to the access points. With the detected changes, the radio constraint profile can be updated based on the difference in the number if client devices connected to the access points. In some embodiments, the update may be performed only when the difference surpasses a pre-determined threshold.

In some embodiments, the computer-implemented methods, computer-readable media, and systems for managing power consumption for access points can further detect changes to the current state of the access points and the client devices connected to the access points at a different point in time whereby the changes includes a difference in the location of the client devices connected to the access points. The minimum amount of power needed to facilitate connection to client devices closer to the access points is generally less than the minimum amount of power needed to facilitate connection to client devices farther away from the access points.

In some embodiments, the identifying of the settings for the access points further is based on the satisfaction of customizable constraints. An example customizable constraint ay include a pre-determined performance requirement.

In some embodiments, the access points being monitored for the pre-determined period of time all belong to the same enterprise. In other embodiments, the access points may share a same location where an example location includes being in the same building.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As described herein, the present disclosure covers a proposed solution for managing power consumption of Wi-Fi access points. The solution is composed of three parts. A first part creates power profiles for each of the switches having Wi-Fi access points within a computer network that detail how power consumption for an access point can be modified based on changing one or more elements associated with the access point. The second part creates a time-based radio constraint profile that details power requirements for an access point based on client devices connected to the access point within a pre-defined area to ensure that each client device can connect and stay connected with the access point. The third part utilizes machine learning to generate a model that identifies optimal settings for the access point in order to achieve a specific level of power consumption for the access point. Further details regarding each of the three parts associated with managing power consumption for access points will be provided below.

Figure 1:
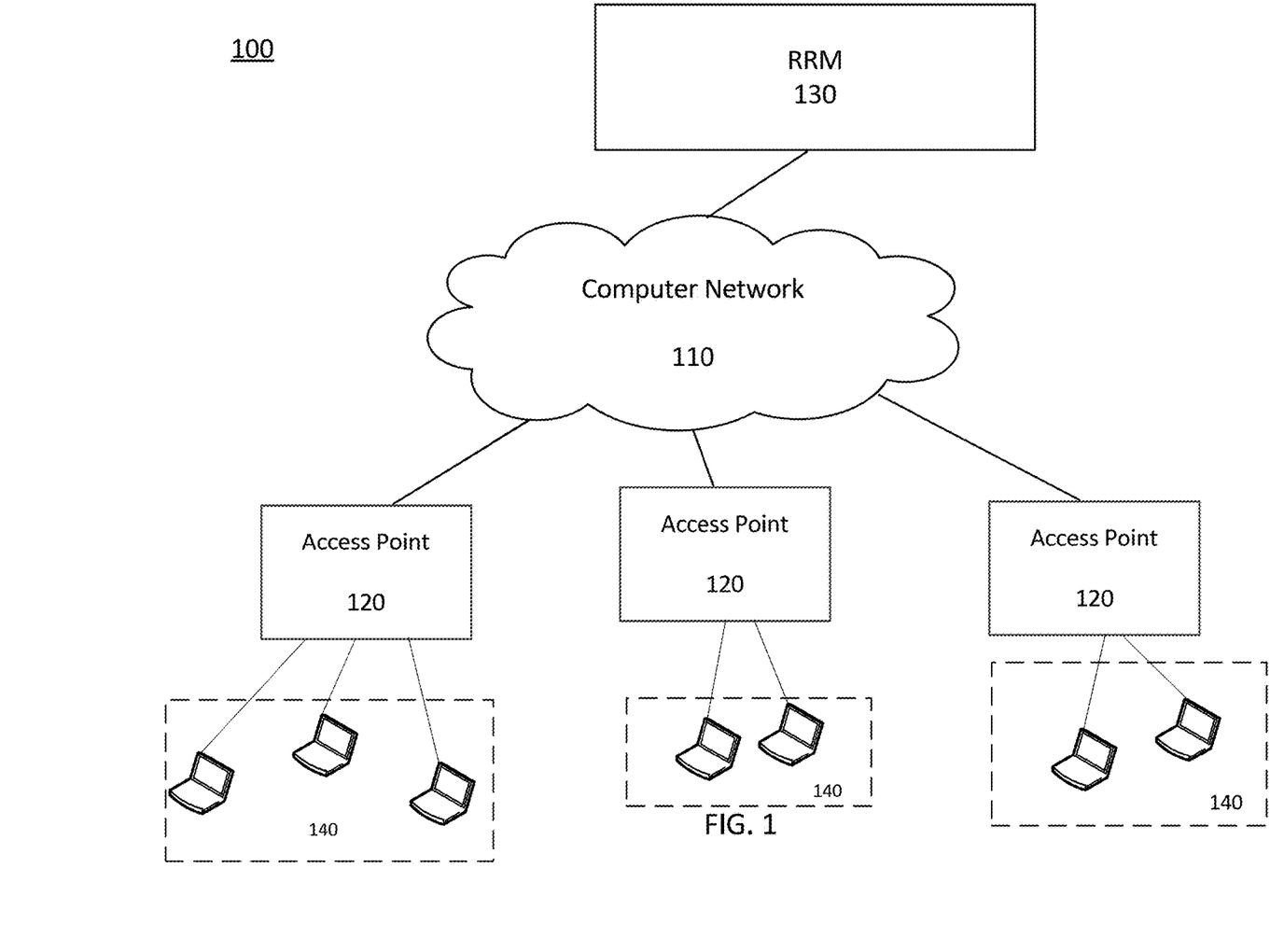
FIG. 1 is a conceptual block diagram illustrating an example network environment in accordance with various embodiments of the subject technology.

FIG. 1 is a conceptual block diagram illustrating an example network environment 100 in accordance with various embodiments of the subject technology. The network environment 100 includes a computer network 110 (e.g. Wi-Fi) that has various different Wi-Fi access points 120. The access points 120 may be associated with the same enterprise or even different enterprises within a same area (e.g. same building).

The Radio Resource Management (RRM) 130 is a wireless local area network (WLAN) controller function. The RRM 130 may be implemented, for example, via a computing device or within the cloud. The RRM 130 is used to set the power and channels for each of the access points 120. When setting the power and channel for each of the access points 120, the RRM takes into account the signals between the different access points 120, the number of client devices 140 associated with each access point 120, and the signal levels for each of the client devices 140 at each access point. The power and channel set for each access point 120 is provided in order to best coordinate the power and channel for all access points within range of one another.

The client devices 140 may be computing devices that the enterprise may be aware of and can monitor such as desktops. Furthermore, the client devices 140 may also include mobile devices and laptops that are capable of entering and leaving the computer network of the enterprise and/or an area of coverage associated with an access point 140 of the enterprise.

Because an enterprise may have multiple Wi-Fi access points or a particular area (e.g. building) may have multiple Wi-Fi access points nearby each other, there is a need to establish different channel and power consumption characteristics. Furthermore, enterprises having multiple Wi-Fi access points may need to control a total power consumption of all its Wi-Fi access points. In order to understand how the power consumption of a Wi-Fi access point can be modified to achieve different threshold/criteria, a power consumption profile for a switch having one or more access points can be generated.

Figure 2:
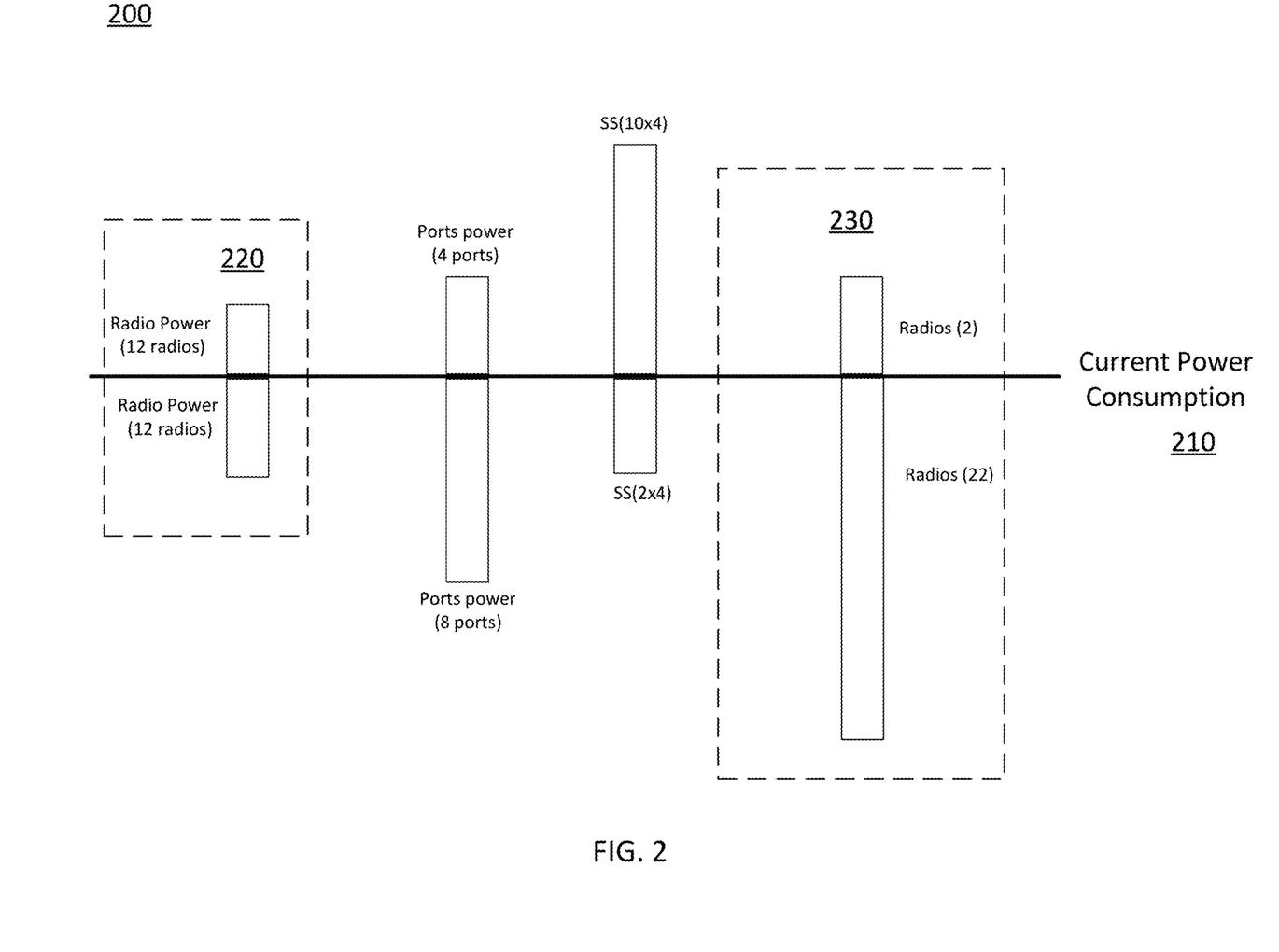
FIG. 2 is a conceptual power consumption profile for a switch.

FIG. 2 is a conceptual power consumption profile 200 for a switch. The power consumption profile 200 is associated with a switch having a number of different Wi-Fi access points within the computer network. The power consumption profile 200 is a collection of data describing the power consumption (or power gain) of the switch in connection with each of the collective access points' power consumption (or power gain) with respect to one or more different elements of the Wi-Fi access point at a current state of power consumption.

The power consumption profile 200 is generated via a power orchestrator that monitors and records power gain (or consumption) of Wi-Fi access points of the switch. Furthermore, the power orchestrator notes the elements associated with the Wi-Fi access point that are enabled or disabled corresponding to the recorded power gain (or consumption).

By comparing the different states the Wi-Fi access point and the different elements that are enabled/disabled during the different states, the power orchestrator is able to generate information that can be used to illustrate what elements of the Wi-Fi access points can be enabled or disabled in order to provide incremental power differences between different states.

The power consumption profile 200 details how power consumption for a switch having multiple Wi-Fi access points can be modified to achieve different power consumption levels by changing one or more elements. Example elements associated with the Wi-Fi access point that can be modified to adjust the power consumption of the access point include 1) enabling or disabling radios, 2) enabling or disabling individual spatial streams, 3) enabling or disabling additional ports, and 4) changing an overall power level associated with the use of the radios of the access point.

The modification to each of the elements can be made to adapt to use of the access point (e.g. how many client devices are currently connected and where the client devices are located). For example, if a few client devices are connected (e.g. after-work hours), it may be desired to reduce the number of radios, spatial streams, and ports or reduce a power level associated with each of the radios to conserve power compared to a different scenario where the access point is at peak usage (e.g. during working hours).

As an example, FIG. 2 illustrates a power consumption profile 200 of a switch having twelve different access points. The graph above the current power consumption threshold 210 illustrates further power consumption (cost) while the graph below the current power consumption threshold 210 illustrates further power consumption (gain) in connection with the corresponding elements being enabled and/or disabled. The increased (cost) or decrease (gain) in power consumption corresponds to the enabling or disabling of the different elements on each of the Wi-Fi access points is based on the aggregation of these two values.

In a first scenario 220, each of the twelve access points has two connected radios. With half of the radios being disabled and the other half being enabled, the power consumption profile 200 illustrates the same amount of power consumed (cost) and saved (gained). Because the amount of power consumed (cost) and saved (gained) are similar, the aggregation of the cost and gain concludes that the current power consumption would remain the same/similar. This may be indicative that the current state of power consumption for the switch has its Wi-Fi access points using half of the available radios.

In a second scenario 230, a different relationship between the cost and gain is shown (compared to the first scenario 220). In the second scenario, only two radios will be activated while the remaining twenty-two radios will be disabled. In doing so, the decrease in power consumption (gain) is much greater (as illustrated in the graph below the current power consumption threshold 210) than the power consumption associated with the use of only two radios (illustrated in the graph above the current power consumption threshold 210). Thus the aggregation of the power consumed and gain illustrates that (based on the current power consumption threshold 210), that the overall power consumed by the switch would be less. This would make sense that as more radios are disabled, a reduction in power consumption would be realized when comparing the second scenario 230 with the first scenario 220 where half of the radios were enabled and the remaining half were disabled.

Figure 3:
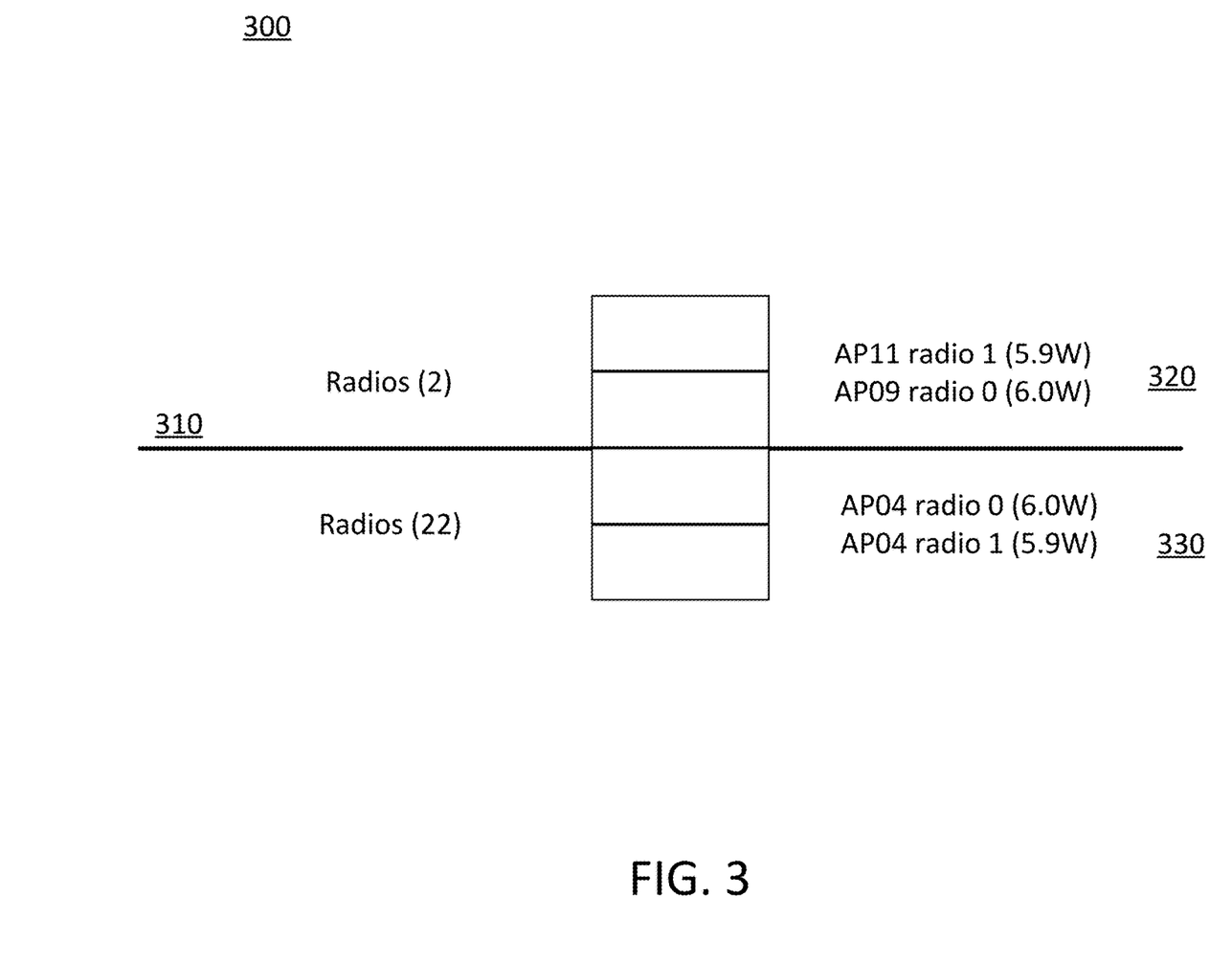
FIG. 3 is an example detailed representation of the power consumption and savings associated with each access point.

In addition to providing the overall power consumption (cost) and power savings (gain) of the switch, the power consumption profile can also be used to detail the individual power consumption and/or savings on a per Wi-Fi access point basis. FIG. 3 is an example detailed representation of the power consumption and savings 300 associated with each access point. Similar to FIG. 2, FIG. 3 shares the same current power consumption threshold 310. Furthermore, graphs above the current power consumption threshold 310 correspond to additional power consumption (cost) on the switch while graphs below the current power consumption threshold 310 correspond to additional power saying (gain) on the switch. However, FIG. 3 also illustrates the incremental power consumption and/or savings associated with enabling or disabling particular elements of a Wi-Fi access point. For example, in a first scenario 320 turning on one of the radios associated with Wi-Fi access point #9 constitute a 6.0 W increase in power consumption on the switch. In contrast, in a second scenario 330 turning off both radios associated with Wi-Fi access point #4 constitutes a total of 11.9 W in power savings (e.g. 6.0 W savings turning off a first radio and an additional 5.9 W savings when turning off a second radio for Wi-Fi access point #4).

Although FIG. 3 only illustrates an embodiment where the details provide the increase or decrease in power consumptions associated with having different radios of the Wi-Fi access points enabled/disabled, other graphs are also possible that would illustrate the increase or decrease in power consumption associated with other elements (e.g. ports, spatial streams) being enabled or disabled with respect to each Wi-Fi access point associated with a switch.

In addition to the power consumption profile that is generated for each switch, a separate power profile (referred to as a radio constraint profile) for each of the Wi-Fi access points is also generated. The radio constraint profile (RCP) is a profile that takes into account real-time and current conditions of an environment associated with the Wi-Fi access point. For example, the RCP includes information about a current state of the Wi-Fi access point, a number of client devices currently associated with the Wi-Fi access point, and where the client devices are located in connection with the Wi-Fi access point. As the number of client devices changes and their location within the Wi-Fi access point coverage area changes, the RCP can be updated accordingly.

The RCP identifies an amount of power that is needed to ensure that each of the detected client devices within the area covered by the Wi-Fi access point is able to properly connect with the Wi-Fi access point. The number of client devices connected to the Wi-Fi access point and where the client devices are located can influence the amount of power that is needed. For example, if all the client devices are located near the Wi-Fi access point, less power may be needed to connect the client devices with the Wi-Fi access point compared to if the client devices were located at the edge of the Wi-Fi access point coverage area. Furthermore, areas that include a lesser number of client devices may require less power for the Wi-Fi access point to enable connection with each of the client devices compared to areas with more client devices. There may also be other factors that can also be considered that influence the amount of power that would be needed (e.g. maintaining a pre-determined threshold of quality performance/user experience) for each of the Wi-Fi access points.

By using both the power profiles for the switches and the radio constraint profiles for the Wi-Fi access points, machine learning logic can then be used to run through different scenarios (e.g. what elements of each access point can be modified to achieve different power consumption levels) using various constraints (e.g. maximum power consumption allowed, minimum power for a Wi-Fi access point required to ensure connection with each client device) in order to identify settings for each Wi-Fi access point that would provide for optimal power consumption for each of the Wi-Fi access points within an enterprise or an area (e.g., building) during a current period of time. The settings outputted by the machine learning logic identifies how each of the Wi-Fi access points can be currently programmed/modified (e.g. enabling/disabling radios, ports, spatial streams) in order to satisfy the constraints on power consumption. The machine learning logic can also take into account customizable preferences (e.g. user preferred quality of service, maximizing power savings) to further influence the output of the machine learning logic.

The machine learning logic goes through each of the many different combination of modifying each of the Wi-Fi access points in order to identify one or more possible group of settings that would achieve the desired constraints on power consumption for each Wi-Fi access point and with respect to the collective group of Wi-Fi access points. This allows a quick and efficient determination on how to configure the Wi-Fi access points to best achieve the power consumption constraint.

Because the current state of the switches, Wi-Fi access points, and client devices connected to the Wi-Fi access points can change in real-time, the machine learning logic is also capable of adapting the settings for each of the Wi-Fi access points in real-time. In this way, the machine learning logic used to identify the settings for each of the Wi-Fi access points is iterative and is capable of automatically adapting the settings for each Wi-Fi access point based on the current environment for each of the Wi-Fi access points.

Figure 4:
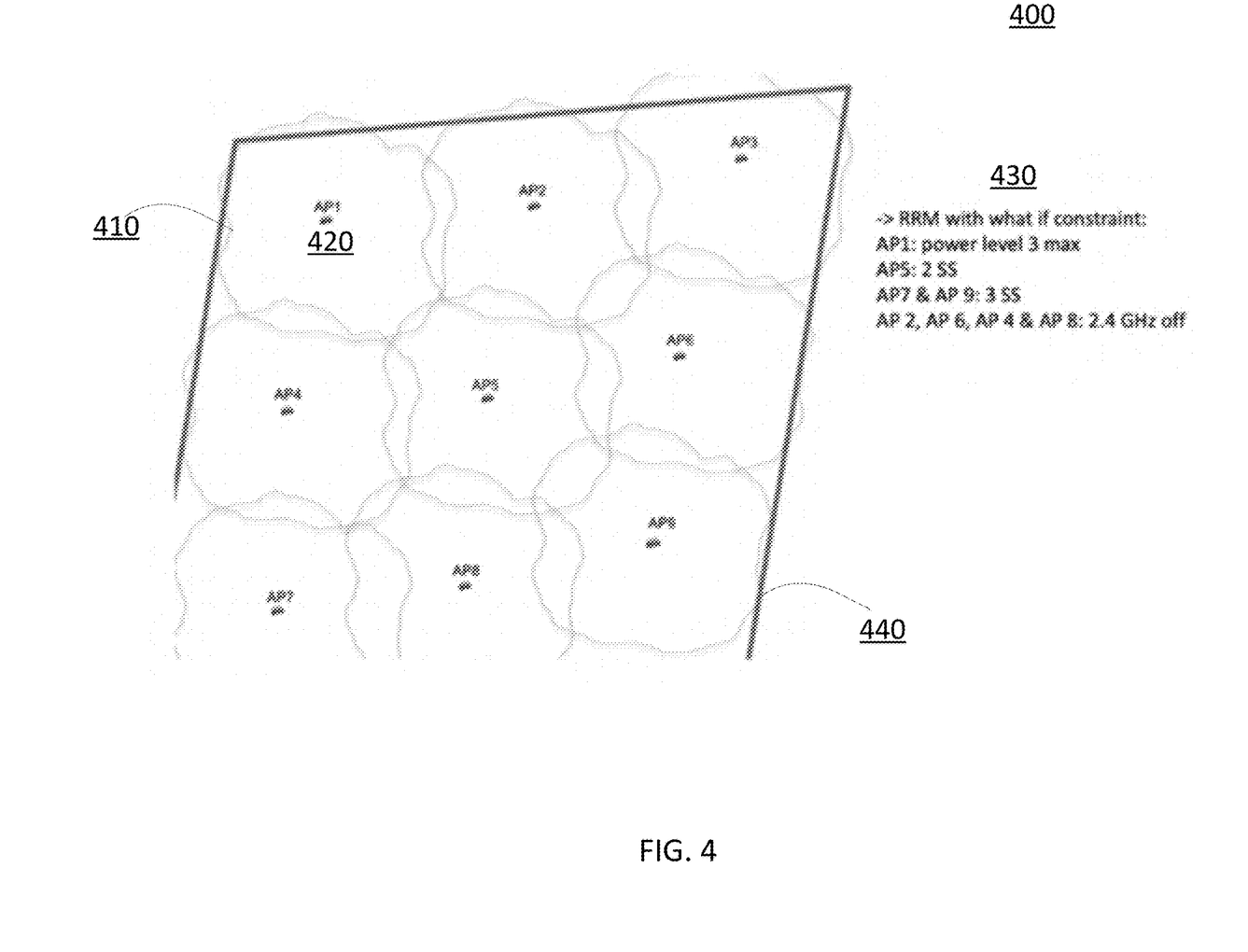
FIG. 4 shows an example power profile for a group of access points.

FIG. 4 shows an example power profile 400 for a group of access points. In particular, the figure shows a coverage area 410 for each of the Wi-Fi access points 420. Furthermore, the figure shows (based on the machine learning logic) a group of settings 430 for each of the Wi-Fi access points are provided that would optimize the collective power consumption of the Wi-Fi access points within the pre-defined area 440 (e.g. same building). In some other embodiments, the collective power consumption of the Wi-Fi access points can also be based on a single enterprise.

As illustrated in the figure, example settings 430 can provide 1) a suggested power level Wi-Fi access point #1 should operate at, 2) how many spatial streams Wi-Fi access point #5, #7, and #9 should use, and 3) at what power Wi-Fi access points 2, 6, 4, and 8 should operate at. These settings 430 correspond to a current state of each of the Wi-Fi access points with the client devices associated with the Wi-Fi access points and pre-set constraints (e.g. optimize power consumption for each of the Wi-Fi access points below a pre-determined threshold). Notification can be provided when significant changes occur within one or more of the Wi-Fi access points (e.g. a threshold increase or decrease in a number of client devices connecting to a Wi-Fi access point) that would necessitate an updated set of settings 430. Furthermore, updates to the settings 430 can also be provided whenever updated constraints (e.g. pre-determined quality of service, maximum power consumption gains) are provided.

Figure 5:
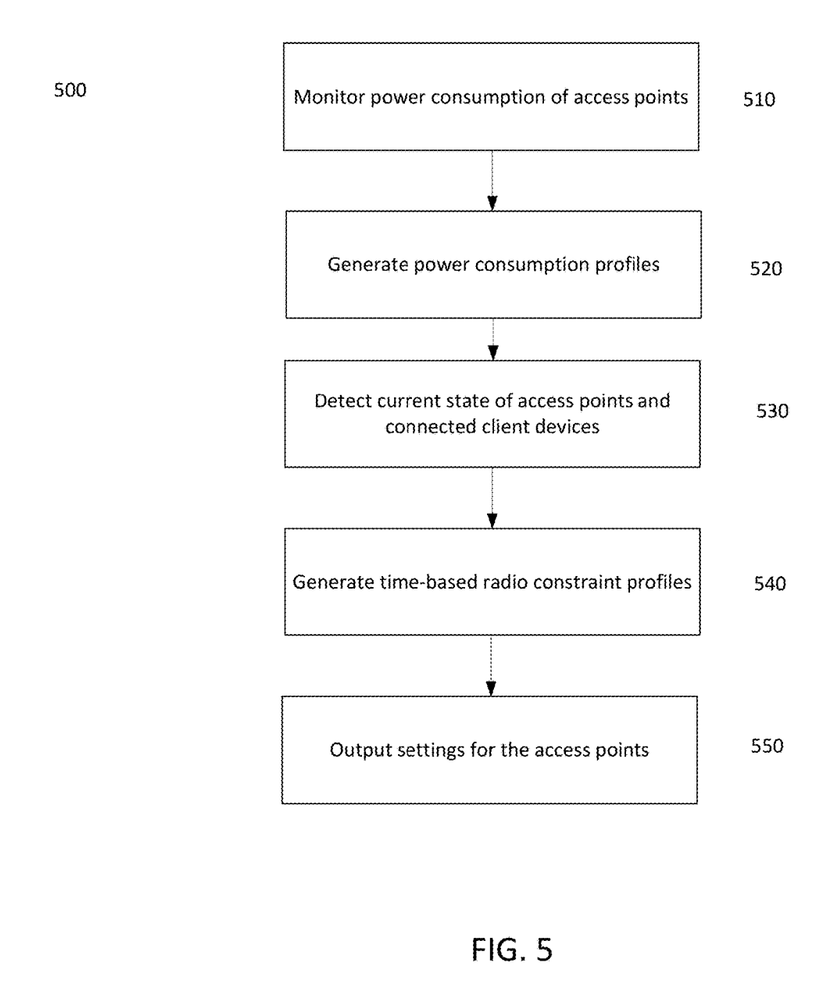
FIG. 5 shows an example method in accordance with various embodiments of the subject technology.

FIG. 5 shows an example method 500 in accordance with various embodiments of the subject technology. The method 500, illustrated in the figure, summarizes the steps associated with the three part solution directed at managing power consumption of Wi-Fi access points in order to meet power consumption constraints: 1) creating power profiles for each of the switches having Wi-Fi access points within a computer network, 2) creating a time-based radio constraint profile, and 3) using machine learning to identify a group of settings for each Wi-Fi access point that satisfies pre-determined power consumption constraints (such as having all access points having a power consumption total that is less than a pre-determined threshold).

In step 510, power consumption of each of the access points of a computing network are monitored. A current state (e.g., the elements of each access point that are enabled/disabled) and associated power consumption is recorded over a period of time. The information is collected in order to be able to identify the various different combination of elements that (when enabled and/or disabled) product the different power consumption levels for the access points.

By using the information collected in step 510, power consumption profiles for switches (having one or more access points) can be generated in step 520 that provide the details of what elements of the access points can be enabled or disabled to provide particular incremental power consumption levels. The details can provide information about the difference between different states (e.g., what modifications to elements to perform) for the access points that can incrementally increase or decrease the power consumption to meet a desired constraint.

In step 530, current state of each of the access points is detected. The current state of the access points include the settings associated with the elements (e.g., ports, radios, power levels, spatial streams) that are enabled/disabled as well as the number of client devices currently being serviced by the access point. By using the information about the current state of the access point, a time-based radio constraint profile is generated for each access point in step 540. The radio constraint profile details the minimum amount of power and related settings that is required to ensure that each of the client devices can connect with the access point with a pre-determined level of service. The amount of power and related settings required for the access points to connect with each of the client devices will change in real-time based on the number of client devices currently connect and the location of those client devices in relation to the access point.

By using the power consumption profiles (generated in step 520) and the radio constraint profiles (generated in 540), settings for the access points can be outputted. The settings correspond to modifications of the elements of each nearby access point that would optimize the power consumption of the access points collectively and provide a pre-determined quality level of service. The settings are obtained by using machine learning logic that simulates the different combinations associated with modifying each of the access points. The machine learning logic is able to also take into account other constraints such having the access points maintain a desired quality level of service.

The settings obtained via the machine learning logic can then be transmitted to each of the access points so that the elements associated with each of the access points can be modified accordingly to achieve the optimal power consumption or satisfy any number of other constraints considered by the machine learning logic.

Figure 6:
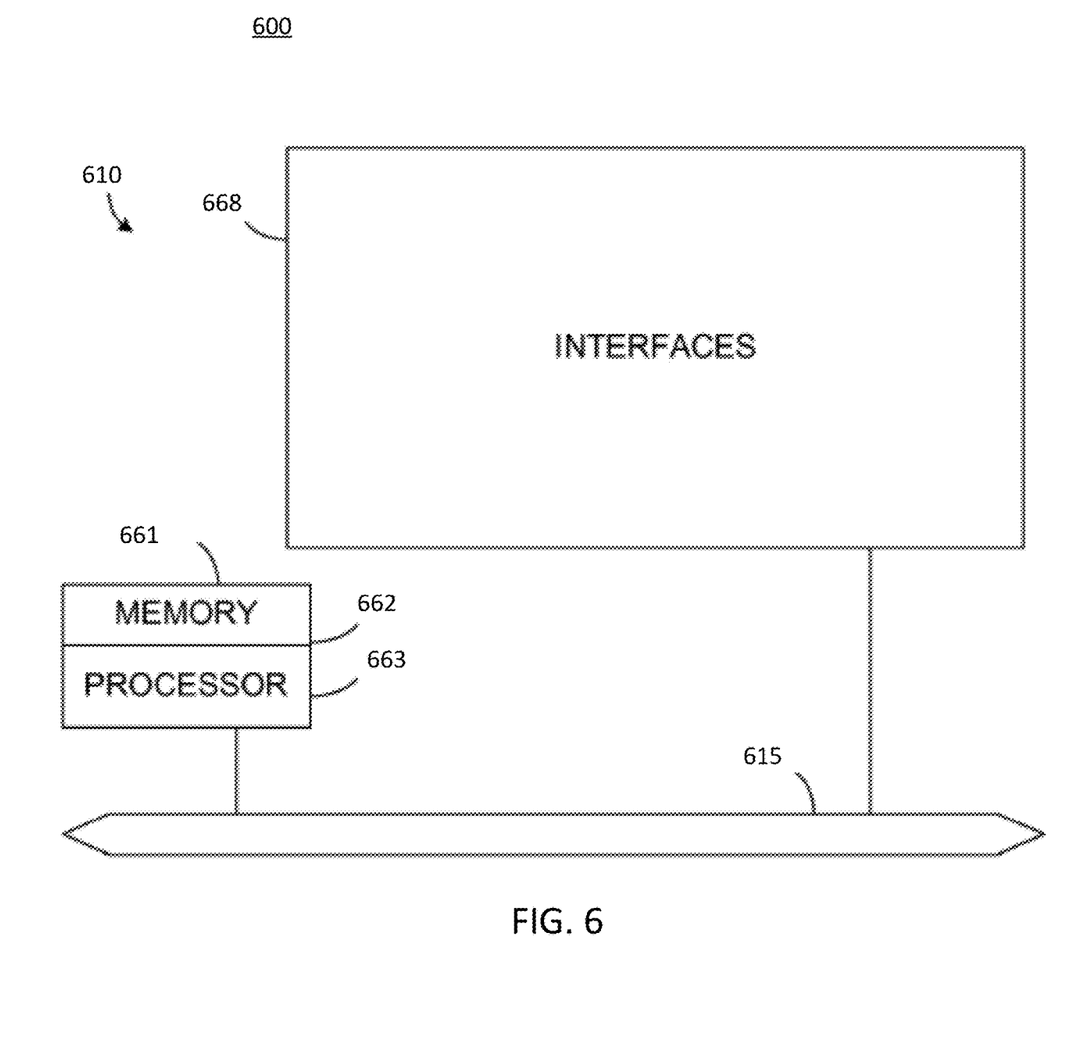
FIG. 6 illustrates an exemplary network device in accordance with various embodiments of the subject technology.

FIG. 6 illustrates an exemplary network device 600 in accordance with various embodiments of the subject technology. Network device 610 includes a master central processing unit (CPU) 662, interfaces 668, and a bus 615 (e.g., a PCI bus). When acting under the control of appropriate software or firmware, the CPU 662 is responsible for performing the steps illustrated in FIG. 5. The CPU 662 preferably accomplishes all these functions under the control of software including an operating system and any appropriate applications software. CPU 662 may include one or more processors 663 such as a processor from the Motorola family of microprocessors or the MIPS family of microprocessors. In an alternative embodiment, processor 663 is specially designed hardware for controlling the operations of router 610. In a specific embodiment, a memory 661 (such as non-volatile RAM and/or ROM) also forms part of CPU 662. However, there are many different ways in which memory could be coupled to the system.

The interfaces 668 are typically provided as interface cards (sometimes referred to as "line cards"). Generally, they control the sending and receiving of data packets over the network and sometimes support other peripherals used with the router 610. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 662 to efficiently perform routing computations, network diagnostics security functions, etc.

Although the system shown in FIG. 6 is one specific network device of the embodiments, it is by no means the only network device architecture on which the present embodiments can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 661) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 7:
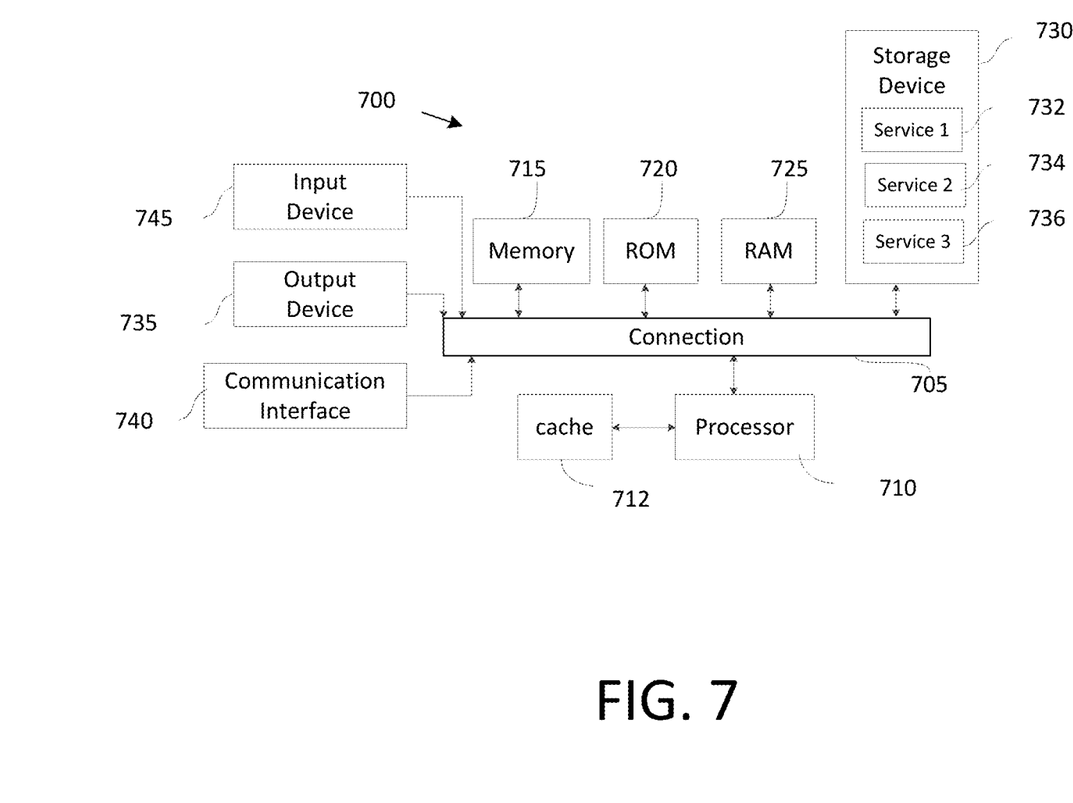
FIG. 7 shows an example computing system in accordance with various embodiments of the subject technology.

FIG. 7 shows an example computing system 900 in accordance with various embodiments of the subject technology. The example computing device can correspond to any of the computing devices (e.g., RRM) illustrated in FIG. 1. Furthermore, the example computing device may also make up any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740 which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, fir example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method for managing power consumption of a plurality of access points, the method comprising:
   monitoring power consumption of the plurality of access points for a pre-determined period of time;
   generating a power profile based on the monitored power consumption of each access point from the plurality of access points for the pre-determined period of time, wherein the power profile identifies power consumption of each of the access points in relation to enabling or disabling one or more elements associated with operation of each of the access points during the pre-determined period of time;
   detecting a current state of the plurality of access points and client devices connected to the plurality of access points at a current point in time;
   generating a radio constraint profile based on the current state of the plurality of access points and the client devices connected to the plurality of access points at the current point in time, wherein the radio constraint profile identifies a minimum amount of power needed to facilitate connection of the client devices to the plurality of access points;
   identifying settings for the plurality of access points based on the power profile and the radio constraint profile of each of the access points, wherein the identified setting satisfies a power consumption constraint for the plurality of access points;
   transmitting instructions to the plurality of access points to implement the identified settings; and
   in response to detected change to the current state at a different period of time and when the detected change surpasses a threshold, updating the radio constraint profile to reflect the detected change, to the current state, wherein the detected change includes at least a difference in a number of client devices connected to the plurality of access points.

2. The method of claim 1, wherein one of the one or more elements associated with each of the access points that can be enabled or disabled include a number of radios.

3. The method of claim 2, wherein the enabling or disabling of the radios includes modifying a power level of the radios.

4. The method of claim 1, wherein one of the one or more elements associated with each of the access points that can be enabled or disabled include a number of spatial streams.

5. The method of claim 1, wherein one of the one or more elements associated with each of the access points that can be enabled or disabled include a number of ports.

6. The method of claim 1, wherein the detecting of the current state of the plurality of access points and the client devices connected to the plurality of access points comprises:
   identifying how many client devices are connected within a coverage area associated with each of the access points, and
   locating where the client devices are located within the coverage area with respect to a location of each of the access points.

7. The method of claim 1, wherein the settings for the plurality of access points are obtained from a using machine learning logic.

8. The method of claim 1, further comprising:
   detecting changes to the current state of the plurality of access points and the client devices connected to the plurality of access points at a different point in time, wherein the changes includes a difference in the location of the client devices connected to the plurality of access points, wherein the minimum amount of power needed to facilitate the connection to the client devices closer to the plurality of access point is less than the minimum amount of power needed to facilitate the connection to the client devices farther away from the plurality of access point; and
   updating the radio constraint profile based on the difference in the location of the client devices.

9. The method of claim 1, wherein the identifying of the settings for the plurality of access points further satisfy customizable constraints, and wherein the customizable constraints include a pre-determined performance requirement.

10. The method of claim 1, wherein the plurality of access points monitored for the pre-determined period of time all belong to the same enterprise.

11. The method of claim 1, wherein the plurality of access points monitored for the pre-determined period of time belong to different enterprises that share a same location.

12. The method of claim 11, wherein the same location includes a same building.

13. The method of claim 1, wherein the plurality of access points are Wi-Fi access points.

14. A non-transitory computer-readable medium comprising instructions for managing power consumption of access points, the instructions, when executed by a computing system, cause the computing system to:
monitor power consumption of the plurality of access points for a pre-determined period of time;
generate a power profile based on the monitored power consumption of each access point from the plurality of access points for the pre-determined period of time, wherein the power profile identifies power consumption of each of the access points in relation to enabling or disabling one or more elements associated with operation of each of the access points during the pre-determined period of time;
detect a current state of the plurality of access points and client devices connected to the plurality of access points at a current point in time;
generate a radio constraint profile based on the current state of the plurality of access points and the client devices connected to the plurality of access points at the current point in time, wherein the radio constraint profile identifies a minimum amount of power needed to facilitate connection of the client devices to the plurality of access points;
identify settings for the plurality of access points based on the power profile and the radio constraint profile of each of the access points, wherein the identified setting satisfies a power consumption constraint for the plurality of access points;
transmit instructions to the plurality of access points to implement the identified settings; and
in response to a detected change to the current state at a different period of time and when the detected change surpasses a threshold, updating the radio constraint profile to reflect the detected change to the current state, wherein the detected change includes at least a difference in a number of client devices connected to the plurality of access.

15. The non-transitory computer-readable medium of claim 14, wherein one of the one or more elements associated with each of the access points that can be enabled or disabled include a number of radios.

16. The non-transitory computer-readable medium of claim 14, wherein the enabling or disabling of the radios includes modifying a power level of the radios.

17. A system for managing power consumption of access points, the system comprising:
a processor; and
a non-transitory computer-readable medium storing instructions that, when executed by the system, cause the system to:
monitor power consumption of the plurality of access points for a pre-determined period of time;
generate a power profile based on the monitored power consumption of each access point from the plurality of access points for the pre-determined period of time, wherein the power profile identifies power consumption of each of the access points in relation to enabling or disabling one or more elements associated with operation of each of the access points during the pre-determined period of time;
detect a current state of the plurality of access points and client devices connected to the plurality of access points at a current point in time;
generate a radio constraint profile based on the current state of the plurality of access points and the client devices connected to the plurality of access points at the current point in time, wherein the radio constraint profile identifies a minimum amount of power needed to facilitate connection of the client devices to the plurality of access points;
identify settings for the plurality of access points based on the power profile and the radio constraint profile of each of the access points, wherein the identified setting satisfies a power consumption constraint for the plurality of access points;
transmit instructions to the plurality of access points to implement the identified settings; and
in response to detected change to the current state at a different period of time and when the detected change surpasses a threshold, updating the radio constraint profile to reflect the detected change, to the current state, wherein the detected change includes at least a difference in a number of client devices connected to the plurality of access.

18. The system of claim 17, wherein one of the one or more elements associated with each of the access points that can be enabled or disabled include a number of radios.

* * * * *